United States Patent [19]

Richards

[11] Patent Number: 4,709,590

[45] Date of Patent: Dec. 1, 1987

[54] HERRINGBONE GEARED MULTIPLE LOAD SHARING COUNTERSHAFT TRANSMISSION

[75] Inventor: Elmer A. Richards, Kalamazoo, Mich.

[73] Assignee: Eaton Corporation, Cleveland, Ohio

[21] Appl. No.: 872,798

[22] Filed: Jun. 11, 1986

[51] Int. Cl.$^4$ .............................................. F16H 3/08
[52] U.S. Cl. ........................................ 74/331; 74/410
[58] Field of Search ................... 74/331, 362, 374, 410

[56] References Cited

U.S. PATENT DOCUMENTS

| | | | |
|---|---|---|---|
| 1,320,459 | 11/1919 | Edwards | 74/410 |
| 2,734,396 | 2/1956 | Falk et al. | 74/410 X |
| 2,982,144 | 5/1961 | Wallgren | 74/410 |
| 3,338,109 | 8/1967 | Forsyth et al. | 74/410 |
| 3,354,738 | 11/1967 | Ivanchich | 74/331 X |
| 3,354,739 | 11/1967 | Ivanchich | 74/331 X |
| 3,600,962 | 8/1971 | Ivanchich | 74/331 |
| 3,611,823 | 10/1971 | Richards | 74/410 X |
| 4,106,358 | 8/1978 | Morrison | 74/331 |
| 4,226,135 | 10/1980 | Winter | 74/331 X |
| 4,527,447 | 7/1985 | Richards | 74/331 X |

FOREIGN PATENT DOCUMENTS 2819293 11/1979 Fed. Rep. of Germany ........ 74/362

*Primary Examiner*—Leslie Braun
*Assistant Examiner*—Dwight G. Diehl
*Attorney, Agent, or Firm*—D. A. Rowe; H. D. Gordon

[57] ABSTRACT

A multiple, load-sharing countershaft assembly (12, 14) change gear transmission (10) utilizing double-helical gearing is provided.

7 Claims, 2 Drawing Figures

HERRINGBONE GEARED MULTIPLE LOAD SHARING COUNTERSHAFT TRANSMISSION

BACKGROUND OF THE INVENTION

1. Field of the Invention

This invention relates to transmissions having multiple load sharing countershafts, including means to assure that the torque transmitted by each countershaft is substantially equal, and, in particular, this invention relates to transmissions having multiple, substantially identical load sharing countershafts and utilizing herringbone (also called twin-helical) gearing.

2. Description of the Prior Art

The advantages of utilizing multiple, substantially identical, load sharing countershafts in heavy duty change gear transmissions are well known in the prior art and may be appreciated by reference to U.S. Pat. Nos. 3,105,395; 3,335,616; 3,500,695; 3,611,823 and 4,226,135, the disclosures of which are hereby incorporated by reference.

The advantages of heavy duty change gear transmissions utilizing helical gearing are also well known in the prior art as may be appreciated by reference to U.S. Pat. Nos. 3,772,934 and 3,885,446, the disclosures of which are hereby incorporated by reference.

The advantage of herringbone or double-helical gearing over single-helical gearing, namely, the fact that the axial thrust forces associated with single helical gearing are balanced within the double-helical gear itself resulting in a net axial force of substantially zero, is also well known in the prior art. Herringbone gearing utilized in change gear transmissions may be seen by reference to U.S. Pat. Nos. 3,600,962; 4,429,586 and 4,361,058, the disclosures of which are hereby incorporated by reference.

While the prior art transmissions having multiple, substantially identical, load sharing countershafts, especially the twin countershaft type having a floating mainshaft/floating mainshaft gear structure for radial self-alignment of the gears into an equal or substantially equal load sharing position, have been extremely commercially successful, there does not now exist a commercially available change gear transmission having herringbone or double-helical gearing and multiple load sharing countershafts with means to assure that the load transmitting gearing will tend to automatically self-align into a position wherein each of countershafts transmits a substantially equal torque load.

SUMMARY OF THE INVENTION

In accordance with the present invention, a change gear transmission having multiple load sharing countershafts and herringbone gear with means for allowing the load transmitting gearing to self-adjust to a position of substantially equal load sharing between the countershafts is provided.

A herringbone geared, change gear, simple transmission, or transmission section, is provided with multiple, substantially parallel load sharing countershafts each carrying herringbone countershaft gears constantly meshed with central herringbone gears clutchable to a centrally located shaft such as a mainshaft, input shaft or output shaft. The countershaft gears define gear sets comprising one substantially identical countershaft gear on each of the countershafts all of which are in meshing engagement with the same centrally located gear.

The gearing is mounted to provide both axial and radial adjustment, or floating, into a self-aligned position of equal or substantially equal torque transmitting distribution. This is accomplished by axially fixing all of the gears on one, but only one, of the central shaft or countershafts to axially locate the gear sets. One, but only one, of the central gears or of the countershafts is axially restrained relative to a housing and all but one of the countershafts has the gear that constantly transmits torque whenever the countershafts are transmitting torque (i.e. usually the input or output gear set) circumferentially fixed but axially moveable relative to the countershaft to which it is rotatably fixed. Preferably, the central gears are provided with a degree of radial freedom relative to the central shaft and/or the central shaft is provided with a degree of radial float relative to the axis of the countershafts, the advantages of which are well known and described in detail in above-mentioned U.S. Pat. Nos. 3,105,395, 3,500,695 and 3,611,823.

Accordingly, it is an object of the present invention to provide a change gear transmission or transmission section, of the multiple, load sharing countershaft type utilizing herringbone or double helical gearing.

This and other objects and advantages of the present invention will become apparent from a reading of the description of the preferred embodiment taken in connection with the attached drawings.

DESCRIPTION OF THE PREFERRED EMBODIMENT

Figure 1:
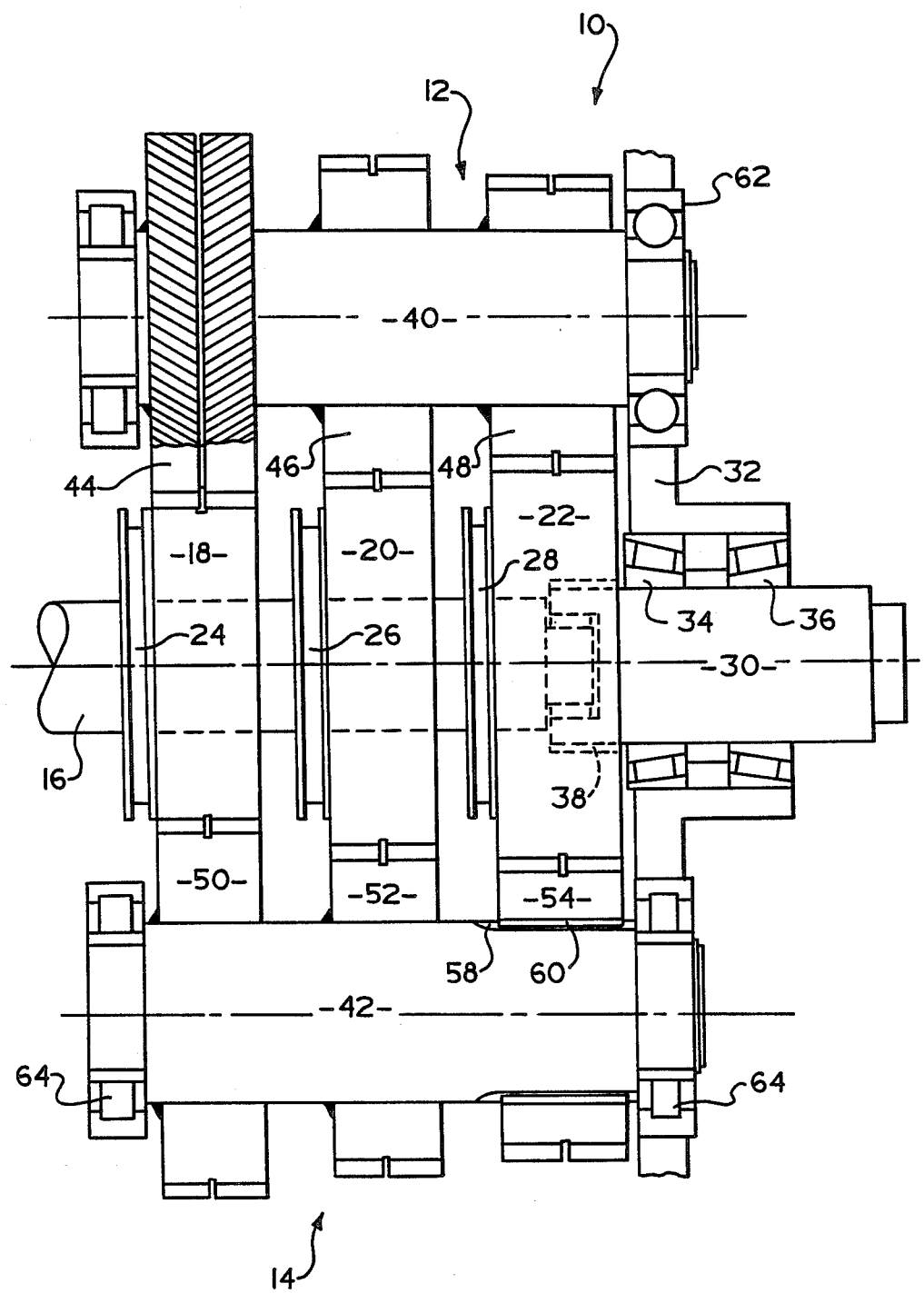
FIG. 1 is a semi-schematic cross-sectional view of a change gear transmission section according to the present invention.

Certain terminology will be used in the following description for convenience only and will not be limiting. The words "upwardly", "downwardly", "rightwardly" and "leftwardly" will designate directions in the drawings to which reference is made. The words and "forward" and "rearward" will refer respectively to the front and rear ends of the transmission as seen is conventionally mounted in the vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is used to designate a change speed transmission or transmission section wherein the operator may select one of a plurality of single gear reductions. The term "compound transmission" is used to designate a transmission having a main transmission section and an auxiliary transmission section connected in series whereby the selected gear reduction in the main transmission section may be compounded by further selected gear reduction in the auxiliary transmission section.

The terms "herringbone gear" and "double-helical gear" are used interchangeably to designate gears having two rows of helical teeth each having an equal helex angle, but on opposite hands. Examples of such gears may be seen by reference to above-mentioned U.S. Pat. Nos. 3,600,962 and 4,361,058. The term is also intended to include other types of gears having two rows of teeth, not necessarily helical, at equal but opposite inclinations relative to the axis of rotation as may been by reference to U.S. Pat. No. 4,429,586, the disclosure of which is hereby incorporated by reference.

In a multiple load sharing countershaft transmission or transmission section, a shaft coaxial with the central shaft and carrying a central gear rotationally fixed thereto is provided which is in driving or in driven relationship to the countershafts. This shaft is herein referred to as the "input/output shaft" and the central gear rotationally fixed thereto as the "input/output gear".

Referring now to FIG. 1, there is illustrated an auxiliary transmission section 10 of a compound change gear transmission. Compound transmissions comprising a main transmission section (not shown) connected in series with an auxiliary transmission section are well known in the art as may be seen by reference to U.S. Pat. Nos. 3,799,002 and 3,283,613, the disclosures of which are hereby incorporated by reference.

The auxiliary transmission section 10 includes a plurality of substantially parallel countershaft assemblies 12 and 14, which are disposed on diametrically opposite sides of a central or input shaft 16.

Figure 2:
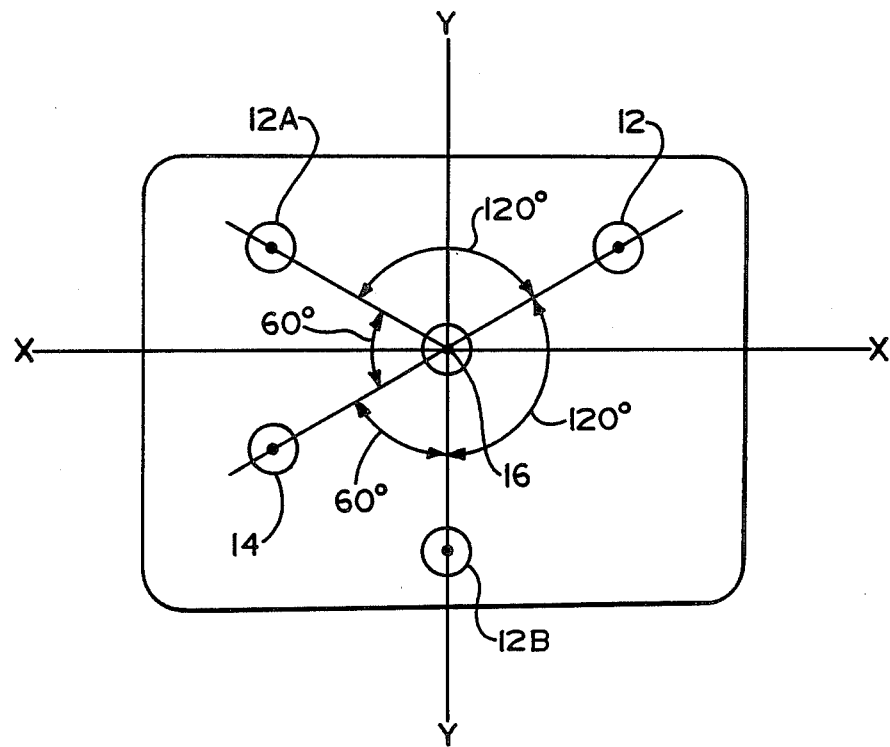
FIG. 2 is a schematic illustration of a transmission case end wall suitable for use in either a twin or triplet countershaft transmission assembly.

The transmission section 10 illustrated in FIG. 1 utilizes two substantially identical countershaft assemblies 12 and 14 and is usually referred to as a twin countershaft transmission. To increase the torque carrying capacity of such a transmission, it is often desirable to provide a third substantially identical load sharing countershaft assembly, i.e. to provide a triplet countershaft transmission. The arrangement of the countershaft assemblies, 12 and 14, for a so-called twin countershaft transmission, and of countershaft assemblies, 12A, 12B and 14, for a triplet countershaft transmission may be seen by reference to FIG. 2. Of course, in theory, any number of countershaft assemblies equally circumferentially spaced upon the central shaft 16 may be utilized.

The central shaft 16, which in other transmission structures may be either a mainshaft or an output shaft, is the input shaft of the auxiliary section 10 (and the mainshaft, or output shaft, of the main transmission section (not shown)) and is surrounded by central, or input shaft, gears, 18, 20 and 22, each of which may be selectively rotationally coupled to the input shaft 16, one at a time, by means of clutches 24, 26 and 28, respectively.

An output shaft 30 (the input/output shaft of auxiliary section 10) is generally coaxial with input shaft 16 and is rotatably supported in housing 32 by a pair of opposed taper bearings 34 and 36. Central gear 22 is fixed rotationally to output shaft 30 as at a splined connection 38.

Each of the countershaft assemblies, 12 and 14, respectively, includes a countershaft, 40 and 42, respectively, to which are rotationally fixed an identical grouping of countershaft gears; 44, 46 and 48, and 50, 52 and 54, respectively. Countershaft gears 44 and 50 are substantially identical and are constantly meshed with central or input gear 18. Countershaft gears 46 and 52 are substantially identical and are constantly meshed with central or input gear 20 while countershaft gears 48 and 54 are substantially identical and are constantly meshed with central gear 22. Preferably, the central gears 18, 20 and 22 surround input shaft 16 and are supported by the countershaft gears constantly meshed therewith. The special advantages of this structure may be seen by reference to above-mentioned U.S. Pat. Nos. 3,105,395; 3,799,002 and 3,500,695.

All of the auxiliary section 10 gearing, gears 18, 20, 22, 44, 46, 48, 50, 52 and 54 are of the double-helical type. Briefly, while prior art transmissions using spur gears continue to be extremely commercially successful, the continued use thereof in heavy-duty vehicles may be limited in view of possibly increasingly stringent noise regulations. Helical gearing has been a traditionally used gear form where noise reduction is an important consideration. However, the commercial application of conventional helical gears to multiple load-sharing countershaft transmissions presents formidable obstacles due to the axial forces generated by helical gearing and also due to the necessity for precision timing of the multiple countershafts.

As will be described in detail below, the above problems are minimized or eliminated by the double-helically geared multiple load sharing countershaft transmission structure of the present invention.

Double helical, or herringbone gears, have equal or superior noise suppression potential compared with conventional helical gears. They have the advantage of eliminating the thrust forces inherent in conventional helical gearing. In fact, they can be used to locate the center shaft gears 18, 20 and/or 22 axially from the countershaft gears. This eliminates the need for centershaft axial gear retaining washers, keys and snap rings which are inherent in present floating mainshaft/floating mainshaft gear type gear boxes. See for example U.S. Pat. Nos. 4,485,686; 4,423,643 and 4,034,620, the disclosures of which are incorporated by reference.

However, in a double-helical geared multiple load sharing countershaft arrangement, it is necessary to have the power carrying gears in precise alignment to achieve uniform tooth loading. The present invention provides a relatively simple solution to this requirement. It is based on the fact that, in a simple transmission or transmission section, only two gear sets are involved in any situation where the countershafts are utilized. These are the gear set which is used to drive the countershafts (i.e. 44–50 or 46–52) and the gear set (48–54) by which the countershafts are driving the mainshaft or the output shaft as the case may be. If a provision is made for axial float in the gearing, the gear forces will produce the desired self alignment. In a double-helical geared multiple load-sharing countershaft transmission, this can be accomplished in a variety of ways.

Referring to the auxiliary section 10, one of the countershaft assemblies, 12, has all of its countershaft gears, 44, 46 and 48, axially as well as rotationally fixed to the shaft 40 to provide the required relative axial location for the associated gear sets. All of the other one or more countershaft assemblies, 14, incorporates a single countershaft gear, 54, which is rotationally fixed to the countershaft 42, timed with the remaining countershaft gears, 50 and 52, of the countershaft assembly 12, but is axially moveable relative to the countershaft 42 and the remaining countershaft gears 50 and 52, which are axially restrained on countershaft 42. While gears 44, 46 and 48 are illustrated as welded to shaft 40, as are gears 50 and 52 illustrated as welded to shaft 42, other means of axially retaining the gears on the shafts, such as snap rings or the like, may be utilized.

The countershaft gear, or gears, 54, allowed to axially move on its countershaft, 42, may be rotationally fixed to the countershaft by means of a splined connection, 58 and 60, a key and keyway, or the like.

The relatively axially moveable countershaft gear, or gears, 54, must be in constant mesh with the central gear 22 that is always under load whenever the countershaft assemblies are transmitting power (i.e. whenever central gears 18 or 20 are clutched to central shaft 16). Typically, this means the relatively axially moveable countershaft gears will be members of either the input or output gear set and will mesh with the input/output gear.

To locate axially all of the gear sets, one of the center line gears, 18, 20 or 22, or one of the countershafts 40 or 42, is axially restrained relative to housing 32, shaft 16 and/or clutches 24, 26 and 28. The remaining centerline gears and countershafts are allowed to axially float.

In the example of auxiliary section 10, this is accomplished by allowing all of the center line gears 18, 20 and 22 to axially float and mounting all of the countershafts 40 except one countershaft 42 on bearings, such as roller bearing 62, which does not incorporate axial restraint. The axially restrained countershaft, 42, utilizes thrust bearings 64. The countershaft assembly 14 having the axially unrestrained gear, 54, may also be one of the axially unrestrained countershafts.

It is noted that, in the embodiment illustrated in FIG. 1, the centerline gears 18, 20 and 22 are axially located relative to the housing 32 and clutches, 24, 26 and 28, by the countershaft assembies 12 and 14 and that axial restraining members, such as are illustrated in above-mentioned U.S. Pat. Nos. 4,485,686; 4,423,643 and 4,034,620, are not required. If any one of the centerline gears is axially restrained on the central shaft 16, then all the countershafts, 40 and 42, must be axially moveable relative to the axially restrained central gear.

Accordingly, it may be seen that a structure for a multiple load sharing countershaft change gear transmission which utilizes double-helical or herringbone gearing and assures that a substantial portion of the total load transmitted by the countershaft assemblies is transmitted by each of the countershaft assemblies is provided.

Although a preferred embodiment of the invention has been disclosed in detail for illustrative purposes, it will be recognized that variations or modifications of the disclosed apparatus, including the rearrangement of parts, lie within the scope of the present invention.

I claim:

1. A change speed gear transmission, comprising:
   a plurality of spaced countershafts having parallel axes and means supporting said countershafts for rotation;
   a plurality of sets of countershaft gears nonrotatably mounted on said countershafts, each set comprising one gear on each of the countershafts, the gears of each set being substantially identical;
   driving/driven means for rotating/rotation by said countershafts, said driving/driven means comprising an input/output gear meshed with a set of countershaft gears, an input/output shaft in direct driving contact with said input/output gear and means mounting said input/output gear nonrotatably with respect to said input/output shaft;
   a rotatable central shaft arranged substantially parallel with said countershafts and located therebetween such that said countershafts are substantially equally circumferentially spaced thereabout and means supporting said central shaft for rotation, said central shaft being substasntially axially aligned with said input/output shaft;
   a plurality of central gears encircling said central shaft, each of said central gears constantly meshed with a set of countershaft gears;
   clutch means for selectively establishing at least one dirving connection between said input/output shaft, countershafts and said central shaft through a set of countershaft gears and a selected central gear;
   said transmission characterized by:
   all of said gears being double-helical gears; and
   all of the countershaft gears rotatably fixed to one of said countershafts also axially fixed to said one of said countershafts and, on all of the other countershafts, all but the countershaft gear meshed with the input/output gear axially fixed to the countershafts with which they are rotationally fixed, the countershaft gears rotationally fixed to said all of the other countershafts and meshed with the input/output gears being axially moveable relative to the countershaft rotating therewith.

2. The transmission of claim 1, wherein one of said countershafts is axially fixed relative to said input/output shaft and all of said central gears are axially moveable relative to said central shaft.

3. The transmission of claim 2, wherein said central gears are radially moveable to said central shaft.

4. The transmission of claim 3, wherein said clutch means is also effective for establishing a direct driving connection between said input/output shaft and said central shaft, said clutch means including a moveable clutch element shiftable axially relative to said input/output shaft for permitting said input/output gear to be drivingly interconnected to said central shaft.

5. The transmission of claim 2, wherein said central shaft is radially moveable relative to said countershafts.

6. The transmission of claim 2, wherein said clutch means is also effective for establishing a direct driving connection between said input/output shaft and said central shaft, said clutch means including a moveable clutch element shiftable axially relative to said input/output shaft for permitting said input/output gear to be drivingly interconnected to said central shaft.

7. The transmission of claim 1, wherein said clutch means is also effective for establishing a direct driving connection between said input/output shaft and said central shaft, said clutch means including a moveable clutch element shiftable axially relative to said input/output shaft for permitting said input/output gear to be drivingly interconnected to said central shaft.

* * * * *